United States Patent [19]

Dapo

[11] Patent Number: 5,687,057
[45] Date of Patent: Nov. 11, 1997

[54] LONGER LIFE ELECTROLYTIC CAPACITORS AND ELECTROLYTE THEREFOR

[75] Inventor: Roland F. Dapo, Columbia, S.C.

[73] Assignee: Philips Electronics North America Corporation, New York, N.Y.

[21] Appl. No.: 487,620

[22] Filed: Jun. 7, 1995

Related U.S. Application Data

[63] Continuation-in-part of Ser. No. 132,735, Oct. 6, 1993, Pat. No. 5,519,567.

[51] Int. Cl.$^6$ .................................................. H01G 9/02
[52] U.S. Cl. .................................. 361/506; 361/504
[58] Field of Search .......................... 252/62.2, 182.1; 29/25.03; 361/503, 506

[56] References Cited

U.S. PATENT DOCUMENTS

| | | | |
|---|---|---|---|
| 3,719,602 | 3/1973 | Anderson | 252/62.2 |
| 4,652,968 | 3/1987 | Shimamoto | 252/62.2 |
| 4,774,011 | 9/1988 | Mori | 252/62.2 |
| 5,111,365 | 5/1992 | Dapo | 361/506 |

*Primary Examiner*—Bot L. Ledynh
*Attorney, Agent, or Firm*—Norman N. Spain

[57] ABSTRACT

An electrolytic capacitor having aluminum anode and cathode members separated by a paper insulating spacer impregnated with a solution of mostly a glycol, water, unsaturated aliphatic dicarboxylic acid, aliphatic diene monocarboxylic acid, monohydric aliphatic alcohol, dodecanedioic acid, phosphoric acid, nitro aromatic compound having a benzene ring-substituted nitro moiety and a dialkylamine in an amount sufficient to provide a pH of 7.0–8.5.

12 Claims, 1 Drawing Sheet

LONGER LIFE ELECTROLYTIC CAPACITORS AND ELECTROLYTE THEREFOR

RELATED APPLICATIONS

This application is a continuation-in-part of application Ser. No. 08/132.735 filed Oct. 6, 1993, now U.S. Pat. No. 5,519,567.

BACKGROUND OF THE INVENTION

It is desirable that the operating lives of electrolytic capacitors be as long as possible. The use of high voltage electrolytic capacitors particularly has increased considerably in recent years. These capacitors are used in large numbers in many devices such as power supply devices, inverters and charge-discharge devices. Increasingly, such devices require longer operating lives, low failure rates, lower ESR (equivalent series resistance) values, as well as high energy densities.

It is particularly important that during their operating lives the rate of failure of such capacitors be held to a minimum. The reason for this is that many times high voltage capacitors are used in a bank in which they are connected in parallel. Thus if one of the capacitors should short while the bank is at operating voltage the other capacitors discharge into it. As a result, the shorting capacitor is frequently totally destroyed. In such a case the device in which the capacitors are employed becomes inoperative.

The failure of such a device may have serious consequences, for example when the device is a power supply and is used in a computer. Here failure of the power supply may result in a loss of memory.

Besides the above-mentioned requirements it is an additional requirement that the electrolyte be free of toxic substances.

Capacitors provided with such an electrolyte are shown in Dapo, U.S. Pat. No. 5,111,365. The electrolyte shown in this patent contains N-methylformamide, 2-methoxyethanol, 2-ethoxyethanol, ethylene glycol or 1,2-propylene glycol, an aromatic dicarboxylic acid such as isophthalic acid or terephthalic acid and an aliphatic amine such as dimethylamine or monomethylamine. These capacitors have been found to be useful at relatively low voltage applications, for example about 55VDC.

Finkelstein, U.S. Pat. No. 4,373,176 shows electrolytic capacitors for use at operating voltages of 200VDC. In these capacitors the electrolyte employed contains a tertiary amine or a dipropylamine mono salt of dodecanedioic acid dissolved in a solvent consisting of ethylene glycol, N-methyl-2 pyrollidone and water. While these capacitors are free of toxic substances, their operating lives are too short or their ESR values are too high for many applications.

SUMMARY OF THE INVENTION

It is an object of this invention to provide capacitors free of toxic substances for use at high and low operating voltages that exhibit improved operating characteristics, particularly lower ESR values and longer operating lives.

It is particularly an object of this invention to provide electrolytic capacitors that are useful at operating voltages of 300VDC and higher.

According to one aspect of the invention a new and novel capacitor comprises anode and cathode members consisting of aluminum separated by a paper insulating spacer impregnated with an electrolyte consisting essentially of a solution containing, as the major ingredient, a glycol of 2–4 carbons, 1.00–12.00 wt. % of water, 0.10–5.00 wt. % of an unsaturated aliphatic dicarboxylic acid of 16–36 carbons, 0.00–4.00 wt. % of an unsaturated diene carboxylic acid of 5–9 carbons, 0.00–10.00 wt. % of a monohydric alcohol of 6–12 carbons, 0.00–10.00 wt. % of dodecanedioic acid, 0.00–0.50 wt. % of phosphoric acid, 0.0–5.0 wt % of a nitro aromatic compound having a benzene ring substituted nitro moiety and a dialkylamine wherein each alkyl is of 1–4 carbons in an amount sufficient to provide a pH 7.0–8.5.

Such a capacitor has been found to be particularly useful over the operating range of 300–600 VDC.

BRIEF DESCRIPTION OF THE DRAWING

The sole FIGURE in the drawing is a graph showing the relation of ESR to operating time for a capacitors of the invention.

DETAILED DESCRIPTION OF THE INVENTION

Figure 1:
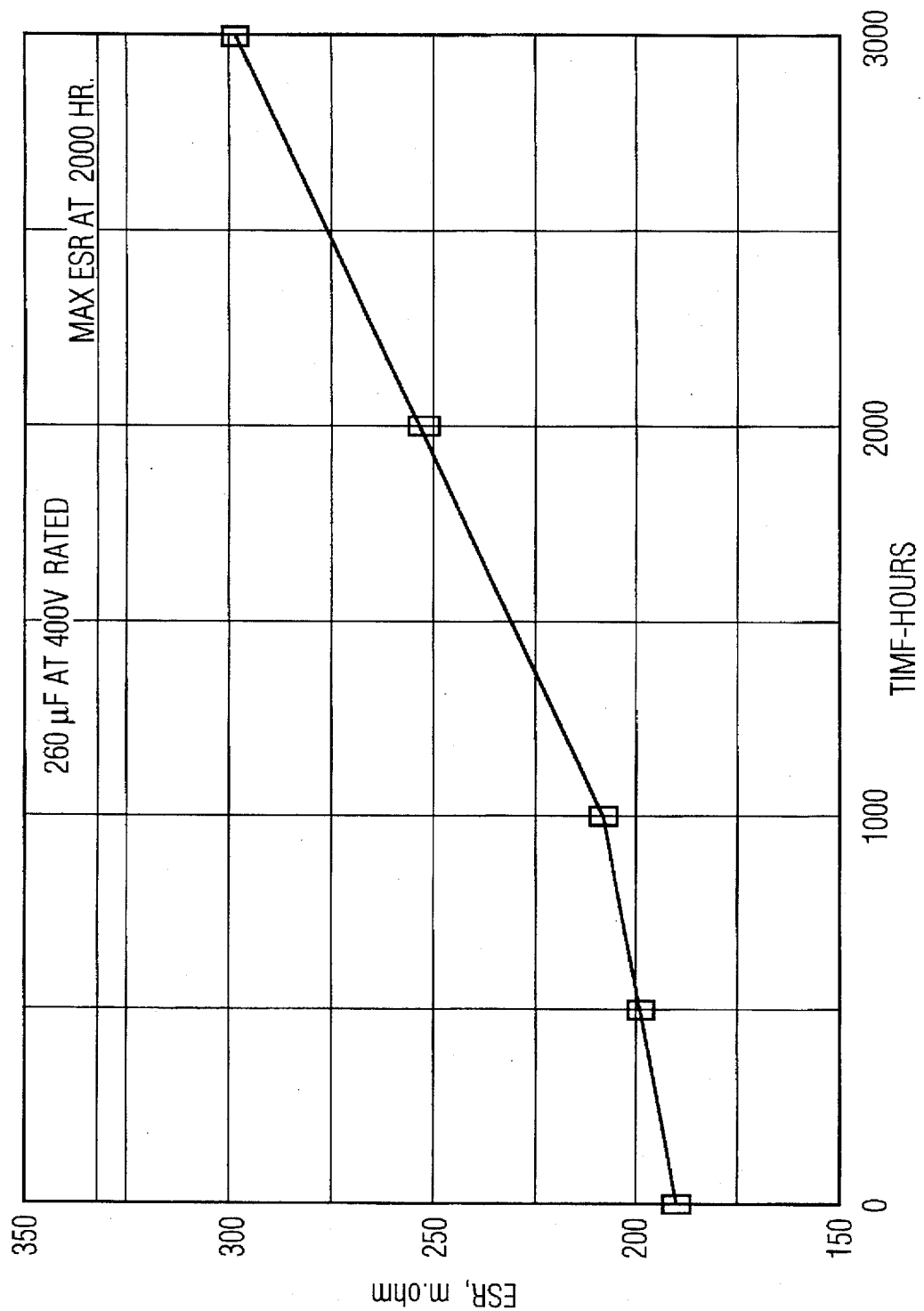

It should be noted that Japanese Patent Application 63-218696 shows an electrolytic capacitor employing an electrolyte containing ethylene glycol or its ethers, water adipic acid or its salts and three or more acids or salts thereof of nitrobenzoic, phthalic, salicylic, benzoic, maleic, boric, phosphoric, oxalic, malic, citric, aspartic, glutamic acid or fatty dicarboxylic acids of 4–12 carbons. There is no teaching or suggestion in this patent of employing pelargonic acid or of employing N methylformamide.

There is also no teaching in this Japanese application that the use of the electrolyte shown therein significantly extends the operating lives of the capacitors.

Further, it should be noted that Example 4 of Dapo U.S. Pat. No. 5,111,365 shows an electrolyte for a capacitor containing 59.75 wt. % of ethylene glycol, 14.00 wt. % of N-methylformamide, 4.50 wt. % of water, 0.50 wt. % of pelargonic acid, 16.00 wt. % of isophthalic acid. 0.005 wt. % of phosphoric acid and 7.25 wt. % of dimethylamine. While capacitors containing this electrolyte are useful at operating voltages of up to 75VDC, they are not useful at voltages of 100VDC or higher as they short out when aging at this higher voltage.

Preferably a monobasic saturated aliphatic acid of 9–15 carbons is present in an amount not greater than 40 wt. % of all the acids present. Highly useful examples of such acids are pelargonic acid and lauric acid.

Although any monohydric aliphatic alcohol of 6–12 carbons such as n-octanol, 1-hexanol and n-heptanol may be used, it has been found that best results are achieved when this alcohol is n-octanol and it is present in an amount of at least 1.00 wt. %.

An example of a highly useful unsaturated aliphatic dicarboxylic acid of 16–36 carbons is dimer acid, particularly in amounts of about 0.40–0.80 wt. % and especially about 0.50 wt. %.

An example of an aliphatic diene monocarboxylic acid of 5–9 carbons that may be employed is sorbic acid (2,4-hexadieneoic acid).

To prevent gas formation at least 0.05% wt. % of a depolarizer, particularly in aromatic nitro compound having ring-substituted nitro moiety is present. Examples of such compounds that may be employed are o-nitroanisole, p-nitrobenzyl alcohol as well as other nitroaromatic alcohols, acids esters and amides thereof.

In place of all or part of the dimer acid phosphoric acid may be employed.

Examples of a glycol that may be employed are ethylene glycol, diethylene glycol and propylene glycol. Ethylene glycol is preferred especially when resistivity is a major concern. The other glycols, when used, are prefereably used as cosolvents with ethylene glycol.

Examples of the saturated aliphatic dicarboxylic acid that maybe employed include dodecanedioic acid and sebacic acid.

An electrolyte that is particularly useful for capacitors for operation in the 300–600VDC range contains about 87.00–88.00 wt. % of ethylene glycol, 1.00–2.00 wt. % of pelargonic acid, 0.75–2.00 wt. % of 1-octanol, 0.40–0.80 wt. % Of dimer acid, 0.00–0.10 wt. % of phosphoric acid, 0.10–0.50 wt. % of sorbic acid, 1.00–3.00 wt. % of dodecanedioic acid, 4.00–8.00 wt. % of water and 1.10–1.40 wt. % of dimethylamine.

For a more complete understanding of the invention the invention will now be described in greater detail with reference to the following examples, table and FIGURE of the drawing.

EXAMPLE I

The following electrolyte was prepared:

| Chemical | Wt. % |
| --- | --- |
| ethylene glycol | 87.65 |
| pelargonic acid | 1.50 |
| 1-octanol | 1.00 |
| dimer acid | 0.50 |
| 85% phosphoric acid | 0.05 |
| hexadienoic acid | 0.25 |
| dodecanedicarboxylic acid | 1.85 |
| water | 6.00 |
| dimethylamine | 1.20 |

These ingredients were mixed together and then heated to 85° C. to dissolve all the solids.

The resultant electrolyte exhibited the following properties when measured at 30° C., resistivity=620 ohm.cm, pH=7.8.

This electrolyte was found to be particularly useful for employment in electrolytic capacitors designed for use in the 300–500 VDC range.

The electrolyte of Example I was used to impregnate paper separators in 400VDC computer style electrolyte aluminum capacitors with 630EFV anodes.

These capacitors were placed in an oven heated to 105° C. and the results after various periods of time are shown in the following table;

TABLE

EVALUATION OF EXAMPLE I OF HIGH VOLTAGE FILL ELECTROLYTE CAPACITOR TEST DATA
CAPACITOR VOLTS - 400

| U/N | IL5 min. | CAP(uF) | % INIT | ESR (ohms) | % INIT | IMPED (m.ohm) |
| --- | --- | --- | --- | --- | --- | --- |
| INITIAL VALUES (ALL LEAKAGE CURRENTS IN mA) | | | | | | |
| 132 | 1.473 | 2378 | 100.00 | .0210 | 100.00 | .55838 |
| 133 | 2.059 | 2376 | 100.00 | .0260 | 100.00 | .55880 |
| 134 | 1.350 | 2398 | 100.00 | .0290 | 100.00 | .55384 |
| 135 | 1.363 | 2463 | 100.00 | .0240 | 100.00 | .53902 |
| 136 | 1.396 | 2452 | 100.00 | .0250 | 100.00 | .54147 |
| 137 | 1.630 | 2462 | 100.00 | .0240 | 100.00 | .53923 |
| 138 | 1.488 | 2400 | 100.00 | .0270 | 100.00 | .55328 |
| 139 | 1.775 | 2398 | 100.00 | .0260 | 100.00 | .55369 |
| AV | 1.481 | 2416 | 100.00 | .0260 | 100.00 | .54971 |
| 500 HOUR VALUES | | | | | | |
| 132 | 1.936 | 2314 | 97.31 | .0260 | 96.30 | .57374 |
| 133 | 1.731 | 2315 | 97.43 | .0270 | 103.85 | .57354 |
| 134 | 1.726 | 2336 | 97.41 | .0250 | 86.21 | .56831 |
| 135 | 1.855 | 2404 | 97.60 | .0240 | 100.00 | .55222 |
| 136 | 1.637 | 2392 | 97.55 | .0250 | 100.00 | .55503 |
| 137 | 1.633 | 2405 | 97.68 | .0240 | 100.00 | .55199 |
| 138 | 1.795 | 2337 | 97.38 | .0260 | 96.30 | .56811 |
| 139 | 1.148 | 2325 | 96.96 | .0260 | 100.00 | .57104 |
| AV | 1.729 | 2354 | 97.42 | .0254 | 97.83 | .56425 |
| 1000 HOUR VALUES | | | | | | |
| 132 | .298 | 2304 | 96.89 | .0300 | 111.11 | .57642 |
| 133 | .341 | 2305 | 97.01 | .0300 | 115.38 | .57617 |
| 134 | .199 | 2329 | 97.12 | .0300 | 103.45 | .57025 |
| 135 | .213 | 2395 | 97.24 | .0300 | 125.00 | .55458 |
| 136 | .200 | 2384 | 97.23 | .0300 | 120.00 | .55713 |
| 137 | .171 | 2397 | 97.36 | .0300 | 125.00 | .55412 |
| 138 | .203 | 2326 | 96.92 | .0300 | 111.11 | .57099 |
| 139 | .216 | 2324 | 96.91 | .0300 | 115.38 | .57148 |
| AV | .208 | 2346 | 97.08 | .0300 | 115.80 | .56639 |
| 2000 HOUR VALUES | | | | | | |
| 132 | .148 | 2304 | 96.89 | .0360 | 133.33 | .57677 |
| 133 | .136 | 2304 | 96.97 | .0360 | 138.46 | .57677 |
| 134 | .158 | 2328 | 97.08 | .0350 | 120.69 | .57078 |
| 135 | .142 | 2393 | 97.16 | .0320 | 133.33 | .55516 |
| 136 | .134 | 2384 | 97.23 | .0340 | 136.00 | .55736 |
| 137 | .143 | 2398 | 97.40 | .0320 | 133.33 | .55400 |
| 138 | .145 | 2328 | 97.00 | .0340 | 125.93 | .57072 |
| 139 | .112 | 2326 | 97.00 | .0350 | 134.62 | .57127 |
| AV | .142 | 2346 | 97.09 | .0343 | 131.96 | .56660 |

Notes:
1. U/N = unit number
2. IL5 = leakage current measured 5 minutes after rated voltage is reached
3. CAP = capacitance measured at room temperature, about 23° C., when measured
4. ESR = equivalent serves resistance measured at 120 Hz
5. 307S = identification of electrolyte
6. IMPED = impedance measured at 120 Hz
7. % INIT = % of initial value An additional number of 400V rated aluminum electrolytic capacitors having an average capacitance measured at room temperature of 260 uF were prepared employing the electrolyte of Example 1. These capacitors were also placed in an oven heated to 105° C. and the ESR values were measured after various periods of time.

The results are shown in the sole FIGURE of the drawing is a graph showing the relationship of the average ESR to time in the oven of these capacitors.

Additional electrolytes with the following composition were prepared:

EXAMPLE II

| Chemical | Wt. % |
| --- | --- |
| Ethylene Glycol | 89.15 |
| DI Water | 3.45 |

-continued

| Chemical | Wt. % |
| --- | --- |
| Pelargonic Acid | 1.50 |
| n-Octanol | 1.00 |
| Dimer Acid | 0.50 |
| Dodecanedioic Acid | 2.10 |
| o-Nitroanisole | 1.00 |
| Dimethylamine | 1.30 |

The initial properties of this composition are: Resistivity at 30° C. 750 Ω.cm pH=8.0. It can be used in capacitors rated up to 450 volts.

EXAMPLE III

| Chemical | Wt. % |
| --- | --- |
| Ethylene Glycol | 78.85 |
| Diethylene Glycol | 12.00 |
| DI Water | 3.48 |
| Lauric Acid | 0.65 |
| n-Octanol | 1.00 |
| Dimer Acid | 0.50 |
| Dodecanedioic Acid | 1.80 |
| o-Nitroanisole | 1.00 |
| Dimethylamine | 0.72 |

The initial properties of this composition are: resistivity at 30° C. 1120 Ω.cm, pH=7.1. 500 volt capacitors have been made with this composition, and tests are beginning. This composition was formulated for operation up to and including ratings of 600 volts.

What is claimed is:

1. An electrolytic capacitor particularly useful for operation in the 300–600 VDC operating range, said capacitor comprising anode and cathode members consisting of aluminum separated by a paper insulating spacer impregnated with an electrolyte consisting essentially of a solution containing, as a major ingredient, at least one glycol of 2–4 carbons, 1.00–12.00 wt. % of water, 0.10–5.00 wt. % of an unsaturated aliphatic dicarboxylic acid of 16–36 carbons, 0.00–4.00 wt. % of an aliphatic diene monocarboxylic acid of 5–9 carbons, 0.00–10.0 wt. % of a monohydric aliphatic alcohol of 6–12 atoms, 0.00–10.00 wt. % of dodecanedioic acid, 0.00–0.10 wt. % of phosphoric acid, 0.00–5.0 of a nitro aromatic compound having a benzene ring-substituted nitro moiety and a dialkylamine wherein each alkyl is of 1–4 carbons in an amount sufficient to provide a pH of 7.0–8.5.

2. An electrolytic capacitor particularly useful for operation in the 300–600 VDC operating range, said capacitor comprising anode and cathode members consisting of aluminum separated by a paper insulating spacer impregnated with an electrolyte consisting essentially of a solution containing, as a major ingredient, ethylene glycol, 1.00–12.00 wt. % of water, 0.10–5.00 wt. % of an unsaturated aliphatic dicarboxylic acid of 16–36 carbons, 0.00–4.00 wt. % of an aliphatic diene monocarboxylic acid of 5–9 carbons, 0.00–10.00 wt. % of a monohydric aliphatic alcohol of 6–12 atoms, 0.00–10.00 wt. % of dodecanedioic acid, 0.00–5.0 of a nitro aromatic compound having a benzene ring-substituted nitro moiety and a dialkylamine wherein each alkyl is of 1–4 carbons in an amount sufficient to provide a pH of 7.0–8.5.

3. The capacitor of claim 2 wherein 0.5–7.0 wt. % of a monobasic saturated aliphatic acid of 9–15 carbons is present in an amount not greater than 40 wt. % of all the acids present.

4. The capacitor of claim 3 wherein at least 0.50 wt. % of dodecanedioic acid is present.

5. The capacitor of claim 4 wherein at least 1.00 wt. % n-octanol is present.

6. The capacitor of claim 5 wherein at least 0.50% of the nitro aromatic compound is present.

7. The capacitor of claim 6 wherein the nitro aromatic compound is o-nitroanisole.

8. The capacitor of claim 7 wherein the monobasic saturated aliphatic acid is an acid selected from the group consisting of pelargonic acid and lauric acid.

9. The capacitor of claim 8 wherein the aliphatic unsaturated dicarboxylic acid is dimer acid.

10. The capacitor of claim 9 wherein the aliphatic diene monocarboxylic acid is hexadienoic acid.

11. The capacitor of claim 10 wherein the dialkylamine is dimethylamine.

12. The capacitor of claim 11 wherein about 0.50 wt. % of dimer acid is present.

* * * * *